UNITED STATES PATENT OFFICE.

FRIEDRICH PICH, OF FRIEDRICHSHAGEN, GERMANY.

FLUX FOR BRAZING.

SPECIFICATION forming part of Letters Patent No. 688,030, dated December 3, 1901.

Application filed June 7, 1901. Serial No. 63,642. (No specimens.)

*To all whom it may concern:*

Be it known that I, FRIEDRICH PICH, engineer, a subject of the King of Prussia, German Emperor, residing at Seestrasse 60, Friedrichshagen, near Berlin, Kingdom of Prussia, German Empire, have invented a certain new and useful Flux for Brazing, of which the following is a specification.

Among fluxes in use for hard-soldering and brazing borax has hitherto been best, because, unlike other fluxes, it is equally applicable to all cases of brazing and because it surpasses all other materials in dissolving different oxids. The use of this salt would be universal were it not for the fact that during the expulsion of its water of crystallization by heat it intumesces so strongly that it is shifted from the place where it has been put and often falls, together with the spelter mixed with it, into the fire. For this reason the operator must start with an excess of the flux and must add more thereof during the brazing operation. Much material and labor would be saved, therefore, if this objectionable property of borax were set aside. A further drawback to the use of this salt is that the surfaces to be brazed must be carefully cleaned before the borax is applied, and even contact with greasy or dirty fingers frequently spoils the surface for brazing. By this invention the foregoing objections are overcome by substituting for borax constituents which form sodium borate during the brazing operation. Such constituents are boric acid and a sodium salt, like sodium carbonate. The action of the mixture containing sodium carbonate is as follows: When the surface to which the mixture has been applied is heated or even if the mixture is applied wet, the sodium carbonate cleans the surface from grease and the like and then frits itself onto the part thus cleansed. The boric acid tends to intumesce somewhat; but being intimately mixed with the sodium carbonate it is held in place thereby. When the mixture is further heated, the carbon dioxid is evolved and sodium borate is formed. The latter is anhydrous under these conditions and does not intumesce. The dissolution of the oxids from the metals to be brazed is very energetic and rapid.

In what has been said it is implied that the proportion in which the constituents are mixed is such that sodium borate is formed on heating the mixture; but either constituent may be used in excess of this proportion without affecting the invention. An addition of sodium chlorid to the mixture enhances the effect by rendering the molten mixture more fluid.

Having now particularly described and ascertained the nature of my said invention and in what manner the same is to be performed, I declare that what I claim, and desire to secure by Letters Patent of the United States, is—

1. A flux for brazing containing sodium carbonate and boric acid intimately mixed together, substantially as shown and described.

2. A flux for brazing containing sodium carbonate, boric acid and sodium chlorid intimately mixed together, substantially as shown and described.

In witness whereof I have hereunto set my hand in presence of two witnesses.

FRIEDRICH PICH.

Witnesses:
  HENRY HASPER,
  WOLDEMAR HAUPT.